US012393824B2

United States Patent
Singer et al.

(10) Patent No.: US 12,393,824 B2
(45) Date of Patent: Aug. 19, 2025

(54) METHODS AND APPARATUS FOR A KNOWLEDGE-BASED DEEP LEARNING REFACTORING MODEL WITH TIGHTLY INTEGRATED FUNCTIONAL NONPARAMETRIC MEMORY

(71) Applicant: Intel Corporation, Santa Clara, CA (US)

(72) Inventors: Gadi Singer, Cupertino, CA (US); Nagib Hakim, Santa Clara, CA (US); Phillip Howard, Gilbert, AZ (US); Daniel Korat, Tel-Aviv (IL); Vasudev Lal, Portland, OR (US); Arden Ma, Granite Bay, CA (US); Erik Norden, San Jose, CA (US); Ze'ev Rivlin, Raanana (IL); Ana Paula Quirino Simoes, Palo Alto, CA (US); Oren Pereg, Amikam (IL); Moshe Wasserblat, Maccabim (IL)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 17/549,645

(22) Filed: Dec. 13, 2021

(65) Prior Publication Data

US 2022/0101096 A1 Mar. 31, 2022

Related U.S. Application Data

(60) Provisional application No. 63/125,962, filed on Dec. 15, 2020.

(51) Int. Cl.
*G06F 11/34* (2006.01)
*G06F 18/21* (2023.01)
(Continued)

(52) U.S. Cl.
CPC ......... *G06N 3/042* (2023.01); *G06F 11/3409* (2013.01); *G06F 18/2178* (2023.01); *G06N 5/022* (2013.01); *G06N 5/045* (2013.01)

(58) Field of Classification Search
CPC ........ G06N 3/042; G06N 5/022; G06N 5/045; G06F 11/3409; G06F 18/2178; G06F 18/2185
See application file for complete search history.

(56) References Cited

U.S. PATENT DOCUMENTS 10,700,935 B1 * 6/2020 Mousavi .............. H04L 41/145
10,904,390 B1 * 1/2021 O'Connor .......... H04M 3/5238
(Continued)

OTHER PUBLICATIONS

A. Bosselut, H. Rashkin, M. Sap, C. Malaviya, A. Celikyilmaz, and Y. Choi, "COMET: Commonsense Transformers for Automatic Knowledge Graph Construction," arXiv:1906.05317 [cs], Jun. 2019, 18 pages.
(Continued)

*Primary Examiner* — Jorge A Casanova
(74) *Attorney, Agent, or Firm* — Hanley, Flight & Zimmerman, LLC.

(57) ABSTRACT

Methods and apparatus for a knowledge-based deep learning refactoring model with tightly integrated functional non-parametric memory are disclosed. An example non-transitory computer readable medium comprises instructions that, when executed, cause a machine to at least estimate a first information extraction cost corresponding to retrieval of information from a local knowledge base, estimate a second information extraction cost corresponding retrieval of information from a remote knowledge base, select an information source based on the first and second estimated information extraction costs, query the selected information source, in response to determining that the selected information source was an external information source, store the queried infor-
(Continued)

mation in the local knowledge base, organize the stored information in the local knowledge base, and return the queried information.

24 Claims, 11 Drawing Sheets

(51) Int. Cl.
*G06N 3/042* (2023.01)
*G06N 5/022* (2023.01)
*G06N 5/045* (2023.01)

(56) References Cited

U.S. PATENT DOCUMENTS

| | | | | |
|---|---|---|---|---|
| 11,164,083 | B2* | 11/2021 | Guim Bernat | G06N 3/063 |
| 12,175,365 | B2* | 12/2024 | Yaguchi | G06N 3/045 |
| 2018/0005146 | A1* | 1/2018 | Chintalapaty | G06Q 10/063 |
| 2020/0311552 | A1* | 10/2020 | A | G06N 3/10 |
| 2020/0409826 | A1* | 12/2020 | Balasubramanian | |
| | | | | G06F 11/302 |
| 2021/0019753 | A1* | 1/2021 | Zhao | G06N 5/045 |
| 2021/0081781 | A1* | 3/2021 | Tanizawa | G06N 3/08 |
| 2021/0089921 | A1* | 3/2021 | Aghdasi | G06N 5/04 |
| 2021/0279618 | A1* | 9/2021 | Wang | G06N 20/00 |
| 2022/0019495 | A1* | 1/2022 | Lavi | G06N 20/20 |
| 2022/0114451 | A1* | 4/2022 | Lacewell | G06F 9/505 |
| 2022/0335285 | A1* | 10/2022 | Sundaresan | G06N 3/063 |
| 2023/0131611 | A1* | 4/2023 | Mohanty | G06Q 30/0202 |
| | | | | 718/104 |
| 2023/0274089 | A1* | 8/2023 | Tunstall-Pedoe | G06F 40/40 |
| | | | | 704/2 |
| 2023/0297835 | A1* | 9/2023 | Chai | G06N 3/0495 |
| | | | | 706/25 |
| 2023/0325670 | A1* | 10/2023 | Clemons | G06N 3/09 |
| | | | | 706/15 |
| 2024/0144030 | A1* | 5/2024 | Muñoz | G06N 3/082 |
| 2024/0338602 | A1* | 10/2024 | Harvey | G06N 20/00 |
| 2024/0386015 | A1* | 11/2024 | Crabtree | G06F 16/9024 |
| 2024/0394258 | A1* | 11/2024 | Chen | G06F 16/248 |
| 2024/0419970 | A1* | 12/2024 | Venkatesha | G06N 3/04 |
| 2025/0095341 | A1* | 3/2025 | Cho | G06V 10/235 |

OTHER PUBLICATIONS

"DARPA Perspective on AI." https://www.darpa.mil/about-us/darpa-perspective-on-ai, accessed Apr. 25, 2022, 3 pages.
N. Poerner, U. Waltinger, and H. Schutze, "E-BERT: Efficient-Yet-Effective Entity Embeddings for BERT," arXiv:1911.03681 [cs], May 2020, 15 pages.
T. Févry, L. B. Soares, N. FitzGerald, E. Choi, and T. Kwiatkowski, "Entities as Experts: Sparse Memory Access with Entity Supervision," arXiv:2004.07202 [cs], Oct. 2020, 15 pages.
Z. Zhang, X. Han, Z. Liu, X. Jiang, M. Sun, and Q. Liu, "ERNIE: Enhanced Language Representation with Informative Entities," May 2019, 11 pages.
J. Khandelwal, O. Levy, D. Jurafsky, L. Zettlemoyer, and M. Lewis, "Generalization Through Memorization: Nearest Neighbor Language Models," 2020, 13 pages.
P. Lewis et al., "Retrieval-Augmented Generation for Knowledge-Intensive NLP Tasks," arXiv:2005.11401 [cs], May 2020, 19 pages.
Thompson, N. et al., "The Computational Limits of Deep Learning". MIT Computer Science and AI Lab. arXiv:2007.05558v1 [cs.LG], 46 pages.
Bengio, Yoshua, "Deep Learning for System 2 Processing", AAAI'2019 Invited Talk, Feb. 9, 2020, 31 pages.

* cited by examiner

| | DESIGN FEATURES/SOLUTIONS | RAG | EAE | E-BERT | KNN-LM | ERNIE | KBRM |
|---|---|---|---|---|---|---|---|
| 516 | 1. SELF-CONTAINED SYSTEM WHICH INCLUDES TIGHTLY INTEGRATED NN, KB, AND R&E MODULE | NO | NO | NO | NO | NO | YES |
| 518 | 2. KB INCORPORATES INFORMATION AGGREGATED AND CONSOLIDATED FROM MULTIPLE SOURCES IN A STRUCTURED KG OF DATA ELEMENTS, RELATIONSHIPS BETWEEN ELEMENTS AND CLASSES/ABSTRACTIONS | NO | NO | NO | NO | NO | YES |
| 520 | 3. VAST MAJORITY OF MODEL INFORMATION RESIDES IN THE KB RATHER THAN THE NN | NO | NO | NO | NO | NO | YES |
| 522 | 4. KB CAN INCLUDE NEW/ADDITIONAL INFORMATION DURING INFERENCE | YES | NO | NO | YES | NO | YES |
| 524 | 5. NN IS TRAINED TOGETHER WITH ITS KB, FOCUSING ON LEARNING AT THE HIGHEST ABSTRACTION (MOST GENERAL) LEVEL AVAILABLE AT THE KB | NO | NO | NO | NO | NO | YES |
| 526 | 6. NN EXTRACTS SPECIFICS (DATA ITEMS, RELATIONSHIPS, ATTRIBUTES) FROM THE KB PER EACH F-PROP IN BOTH TRAINING AND INFERENCE | NO | NO | NO | NO | NO | YES |
| 528 | 7. EXPLAINABILITY ("R&E") MODULE TRACKS AND REPORTS OUT THE PARTICULAR INFORMATION AND KB PATH USED PER INFERENCE | YES | NO | NO | NO | NO | YES |
| 530 | 8. A TUNED HW ARCHITECTURE THAT GREATLY IMPROVES LATENCY AND POWER PER QUERY (I.E., PER F-PROP THROUGH INTEGRATION OF LARGE ASSOCIATIVE MEMORY, HASHING FOR EFFICIENT PHYSICAL ACCESS, AND CACHING FOR RAPID ACCESS TO RELATED INFORMATION | NO | NO | NO | NO | NO | YES |

FIG. 5

METHODS AND APPARATUS FOR A KNOWLEDGE-BASED DEEP LEARNING REFACTORING MODEL WITH TIGHTLY INTEGRATED FUNCTIONAL NONPARAMETRIC MEMORY

FIELD OF THE DISCLOSURE

This disclosure relates generally to deep learning, and more particularly, to a knowledge-based deep learning refactoring model with tightly integrated functional nonparametric memory.

BACKGROUND

Deep Learning (DL) models, and more particularly, Knowledge-Based Deep Learning (DL) models are typically coupled to a Knowledge Base (KB), which generally incorporates a large volume of specific information (e.g., particular facts) used to answer queries. The accumulation of information in the corresponding Knowledge Bases (KBs) of these models leads to an increased overall model size over time.

BRIEF DESCRIPTION OF THE DRAWINGS

FIG. 5 is a table illustrating a comparison of features of KBRM with that of previous approaches.

The figures are not to scale. Instead, the thickness of the layers or regions may be enlarged in the drawings. In general, the same reference numbers will be used throughout the drawing(s) and accompanying written description to refer to the same or like parts.

Figure 1:
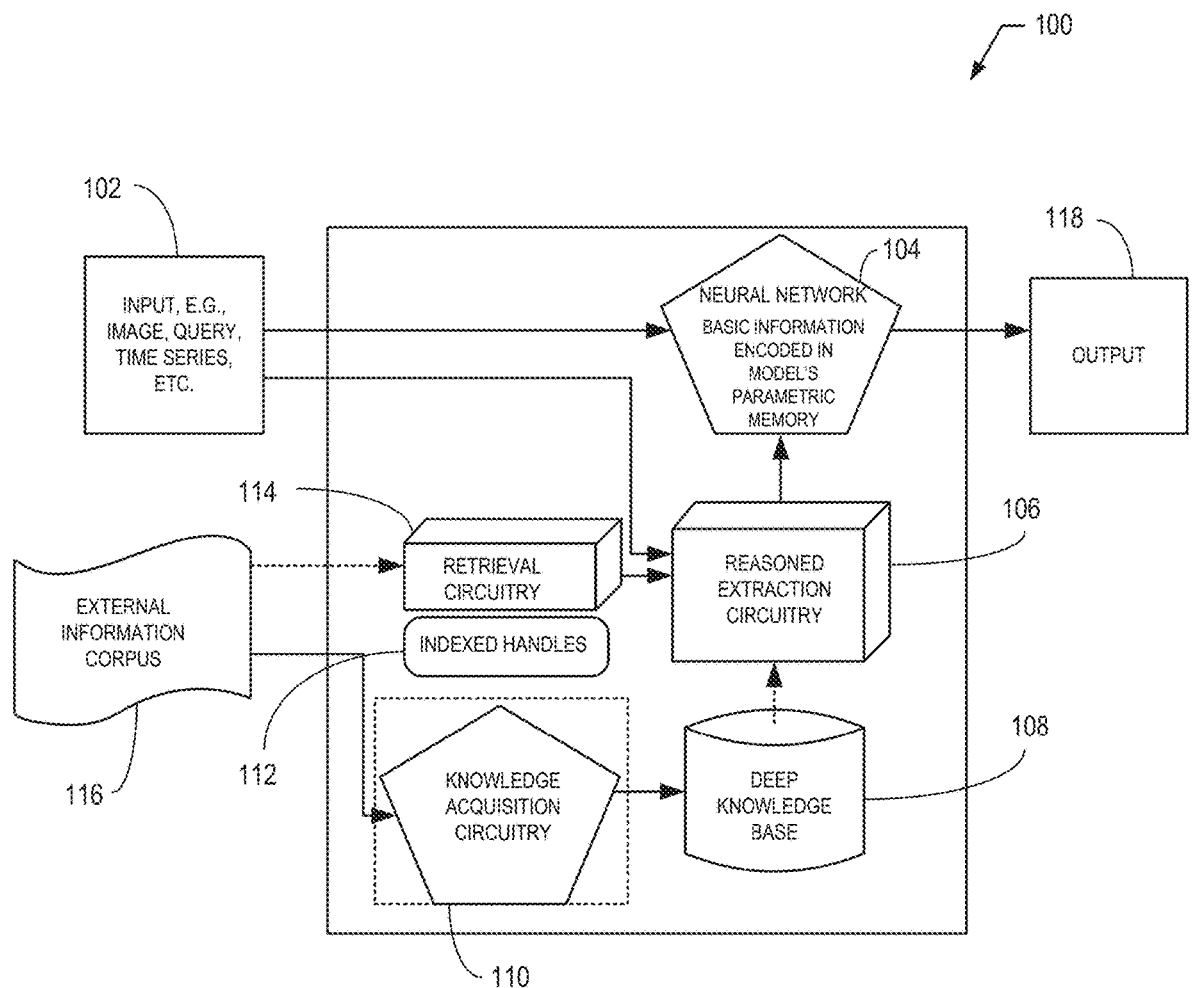
FIG. 1 is a block diagram illustrating a system-level Knowledge-Based Refactored DL Model (KBRM) in accordance with teachings of this disclosure.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations when processing input data such that other input(s) result in output(s) consistent with the recognized patterns and/or associations.

Many different types of machine learning models and/or machine learning architectures exist. In some examples disclosed herein, a Neural Network (NN) is used. Using a Neural Network (NN) model enables the interpretation of data wherein patterns can be recognized. In general, machine learning models/architectures that are suitable to use in the example approaches disclosed herein will be Convolutional Neural Network (CNN) and/or Deep Neural Network (DNN), wherein interconnections are not visible outside of the model. However, other types of machine learning models could additionally or alternatively be used such as Recurrent Neural Network (RNN), Support Vector Machine (SVM), Gated Recurrent Unit (GRU), Long Short Term Memory (LSTM), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained on functions (e.g., extracting necessary information on a per-query basis from the Knowledge Base). However, any other training algorithm may additionally or alternatively be used. In examples disclosed herein, training is performed on the feature-based classification model and appendix classification model.

Training is performed using hyperparameters that control how the learning is performed (e.g., a learning rate, a number of layers to be used in the machine learning model, etc.).

Training is performed using training data. In examples disclosed herein, the training data includes an example set of data stored within a Knowledge Base (KB), however, any other type of data may be used.

Once training is complete, the model is deployed for use as an executable construct that processes an input and provides an output based on the network of nodes and connections defined in the model. The model is stored in a parametric memory for execution by the example KBRM system 100 of FIG. 1.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

While Deep Learning (DL) has recently provided high accuracy solutions for Natural Language Processing (NLP), computer vision, medical diagnosis, and a variety of other applications, the technology has seen several substantial gaps over the years. In particular, Deep Learning (DL) models are growing at an unsustainable rate. A key factor leading to the huge size of DL models is the exhaustive incorporation of unstructured information into the Deep Learning (DL) structure, leading to a highly inefficient implementation. Current DL approaches also have well-documented challenges in Out-Of-Distribution (OOD) accuracy, limited extensibility to new domains, and limited explainability of their results.

Current published approaches for deep learning (DL) have several additional limitations. Some approaches cannot readily adapt to addition of new knowledge. For example, some approaches use a predetermined vocabulary of 1 million entities. Any additions, deletions or modification of the entity memory requires retraining the entire system from scratch, which requires significant computation (e.g., a few days with 64 Tensor Processing Units (TPUs)). Some approaches are accessing direct plaintext in a large document corpus. This class of algorithms relies on the data being directly articulated and tagged in the document corpus, and therefore lacks the general ability to synthesize information from multiple sources.

Additionally, some approaches are incorporating embeddings trained from a Knowledge Graph (KG) as a source of information. These trained embeddings have rather limited layered and abstracted Knowledge Representation and Reasoning (KR&R) constructs, constraining their ability to deduct knowledge from given information. Models for some of the approaches have not shown explainability capabilities, in which an output of an inference (e.g., an answer in a Question and Answer (QnA) solution) is fully traceable to the base information and mapping that yielded that outcome. Model sizes of some of the approaches for more general domains are very large and new contributions in this area have demonstrated a rapid growth in model size over time.

Disclosed herein is a Knowledge-Based Refactored DL Model (KBRM) where the capability of the model is achieved by a Neural Network (NN) tightly coupled with a structured Knowledge Base (KB) which contains aggregated and consolidated information across multiple sources. The NN portion is trained on functions (also can be referred to as 'skills') and on extracting needed information on a per-query basis from the KB. The KB is adjacent to the NN and tightly integrated with it to provide facts and concepts as required to produce high quality results. This separation of machine learned functionality and/or skills in the NN model from a set of facts and concepts in the KB enables significant reduction in DL model size, increased extensibility with reduced retraining and/or adaptation, and much improved explainability by tracking the explicit data being utilized on a per-query basis.

While the distinction between Functionality (or Skills) and the model information does not create non-overlapping sets, many elements can be clearly identified as part of the function (ex: entity recognition) while others can be clearly identified as 'Model information' (ex: '1890' as the year in which Idaho gained statehood). The volume of model data grows at a fast rate as models address more real-life spaces and are expected to handle the very long tail of less frequently used OOD information. A DL model will be considered to be 'Refactored' if the NN model primarily contains 'Skills' and commonly used information in its parametric memory, while the vast majority of the Model Information resides in the associated KB that is accessed as part of executing the function.

A model trained on functions and classes/abstractions will be applicable as effectively to any information of that class whether the particular information was available during training or not. This significantly alleviates the challenges of OOD and domain adaptation. As long as the functions are similar and the classes/abstractions are equivalent, the effective scope of the AI system covers whatever is the scope of information in the KB during inference. For this reason, it is also possible to localize information and customize an AI solution without re-training or fine-tuning. As long as the functions are similar and the classes/abstractions are matched, particular localized information can be applied during inference. This feature of the KBRM contributes to much-improved data extensibility, domain transferability and customization with localized data.

The dual functionality of providing any programmed (non-NN) functionality, as well as outputting explanations to the results delivered by the NN model is highly desirable. In particular, examples of the KBRM disclosed herein provide tracking of the entities and links extracted from the KB to yield the results. They will also include visualization of the embeddings and attention across layers in the latent space. The requirement for the KB to have explicit and intelligible information, relationships and abstractions, enables clear communication of the path used to reach the AI outcome.

The pace of growth of Language Models and other large DL models is costly and unsustainable. By refactoring the DL models and retaining the vast majority of information in an auxiliary KB, model size can be reduced by orders of magnitude and the pace of model growth substantially curtailed. This can have strategic implications for the Total Cost of Ownership (TCO) for both training and inference and boost deployment of DL at scale. Reducing model size opens more opportunities to deploy highly capable AI approaches in systems with power and cost constrains, such as in Edge computing.

KBRMs possess a separation between functional skills and the information on which they operate. This removes much of the statistical limitations caused by a particular distribution present in the DL training data. As long as no new functionality (or skill) is required, the quality of results is dependent on the information present during inference. This information can be broader than what was used for training (therefore alleviating OOD issues) as well as reflect a new domain or localized knowledge. This capability will increase the value of DL approaches in areas like autonomous driving or financial systems where rare events (e.g., 'Black Swan' events) have catastrophic results and thus must be readily recognized. Also, the ability to apply a DL model with minimal retraining to new domains or to localized information opens the door for a much broader use of AI systems for small and medium businesses where the volume of custom information and the available data science capabilities cannot support specialized re-training or model fine-tuning.

In general, current DL systems are considered to exhibit 'black box' inferencing as the mapping is achieved through learned statistical models applied to embeddings in a latent space and cannot be directly traced to the source information in the inference process. A Knowledge-Based Refactored DL Model (KBRM) retrieves its information on a per-query basis from the KB, which has a set of intelligible facts, concepts and relations. The ability to trace the information used for inference enhances the explainability of the results. Explainability is an essential requirement in fields where AI outcomes need to be understood for use at scale (e.g., in the healthcare or financial domains). Explainability of results can also contribute to faster improvement cycles as the cause of the failure might be deduced and the correction might be a KB change rather than model re-training.

The KB can include explicit, intelligible abstractions (such as classes of objects, properties, causal relationships, and more), which allows for higher-level reasoning compared to today's DL systems. This underlying Knowledge Representation & Reasoning (KR&R) capability created by the tightly integrated NN and KB addresses use cases requiring higher levels of machine intelligence.

A KBRM utilizes a relatively small DL model and requires tightly integrated extraction of only needed information for specific input from an auxiliary memory containing the (potentially large) KB. A KBRM can provided through a highly efficient and effective full-stack solution that is optimized across algorithms, SW stack and underlying HW. This can bring into play heterogeneous systems with CPUs/XPUs, and effective large memory integration, such as Intel® Optane™ Persistent Memory. Such highly optimized SW/HW approaches benefit customers and the ecosystem by reducing TCO, power requirements, specialized configurations for massive training, carbon emission footprint, and more.

In a KBRM, the vast majority of information used by the AI system is residing in a KB integrated with the NN. In a non-KBRM, all of the information utilized by the model either resides in parametric memory or is retrieved from some other unstructured source such as plain text.

A KBRM will show little to no degradation when the inference system uses previously learned functionality (skills) to solve for new data that was not reflected in the distribution of the training—either because the data was OOD for training, or because it reflects a new domain not seen during training.

A KBRM will be able to report out what particular information was used for a given query to arrive at the results. It can include the facts being used and any relevant relations and abstractions associated with the facts.

Because only the needed information is included on a per-query basis, a KBRM will provide correct answers even in cases where the information needed is spread over multiple sources or requires reasoning to reach conclusions. It is characterized by leveraging the aggregation, synthesis and abstraction provided by the KB. It will show differentiation where the outcome is not just retrieval of relevant information provided by the sources, but rather requires such aggregation, synthesis, abstraction and deduction.

A full implementation of KBRM includes optimized SW layers and a HW system that can extract information from a KB with very high performance and power efficiency. A KBRM solution will have direct support for per-query extraction from a large memory structure, including hashing of KB elements for fast access, and caching for reduced latency of accessing successive items in a similar graph/memory space.

FIG. 1 is a block diagram illustrating an example Knowledge-Based Refactored DL Model (KBRM) system 100 in accordance with teachings of this disclosure.

Current leading self-contained DL models are growing rapidly in size at an unsustainable pace in part due to incorporating a large volume of specific information (e.g., particular facts). Incorporation of information in parametric models leads to increased model size corresponding to the volume of information that will potentially be needed during inference (irrespective of the likelihood of occurrence in inference). This is expected to continue to grow in real-world use cases. Information memorization by current models also creates a marked difference in result quality between domains based on the degree of coverage provided by the incorporated information.

The example KBRM system 100 employs a method wherein a vast majority of the information required for its functionality resides in an adjacent, tightly integrated, structured Knowledge Base (KB) (e.g., Deep Knowledge Base 108). The example KBRM system 100 is a self-contained model with a few key components—the example Neural Network (NN) 104, its corresponding Deep Knowledge Base (KB) 108, example reasoned extraction circuitry 106, example knowledge acquisition circuitry 110, example indexed handles 112, example retrieval circuitry 114, and an example External Information Corpus 116. The example KBRM system 100 construct results in substantial NN model size reduction, better extensibility and robustness, a path to localization of information and new domains, enhanced explainability, and improved power/performance in both training and inference for information-rich workloads.

The KBRM system 100 accepts an example input 102 (e.g., image, query, time series, etc.) into the example Neural Network (NN) 104. The Neural Network (NN) 104 extracts only the needed information from the Deep Knowledge Base (KB) 108 in order to address this specific input 102 and product an example output 118. However, in examples disclosed herein, if the Deep KB 108 does not already contain the information necessary to produce the intended output 118, the NN 104 works in conjunction with the example reasoned extraction circuitry 106, the example Deep KB 108, the example knowledge acquisition circuitry 110, the example indexed handles 112, the example retrieval circuitry 114, and/or the example External Information Corpus 116 to generate the desired output 118.

The Deep KB 108 is the repository of the information used by the KBRM system 100, and the NN 104, in particular. In examples disclosed herein, the Deep KB 108 will most commonly be represented as a Knowledge Graph (KG) but can also be other structured information representations, such as a table or a relational database. In examples disclosed herein, information stored within the Deep KB 108 will include the relevant basic elements (such as relevant nouns, verbs, and adjectives), as well as applicable relationships between elements, and a hierarchical set of classes/abstractions. In examples disclosed herein, if deemed necessary for the target workload and/or the received input 102, the Deep KB 108 may also include relevant Knowledge Representation (KR) constructs such as declarative knowledge, contextual information, and causality models. The information stored within the Deep KB 108 is aggregated and sorted from multiple resources, consolidating all relevant information (e.g., information across all sources related to a particular entity—like 'Charles Darwin'—will be linked to the representation of that entity). In examples disclosed herein, the information stored within the Deep KB 108 can also be enhanced and/or augmented through successive Machine Learning (ML) iterations. Additionally, in examples disclosed herein, all aspects (e.g., information stored therein) of the Deep KB 108 need to be intelligible and can be reflected in communication as part of an explanation provided by the example reasoned extraction circuitry 106.

The example knowledge acquisition circuitry 110 (explained further in conjunction with FIG. 2) determines whether the required information is presently located in the NN 104. If the information is not in the NN 104, the knowledge acquisition circuitry 110 calculates costs for various information extractions paths (e.g., KB extraction path, external corporal extraction path, etc.) and chooses the lowest-cost extraction path to obtain the necessary information. The example reasoned extraction circuitry 106 creates an accompanying explanation of how the KBRM system 100 came up with this output (e.g., a visualization of embeddings across layers in the latent space). The example retrieval circuitry 114 tracks the entities, links, etc. extracted from the Deep KB 108 to yield the example output 118 and provides that information to the reasoned extraction circuitry 106 to enable clear communication of the path used to reach the AI outcome (e.g., output 118).

The example external information corpus 116 represents a collection of information from external sources, or sources other than the present Deep KB 108 (e.g., Wikipedia, online and/or offline databases, etc.).

The example indexed handles 112 represent a part of the KBRM system 100 wherein the collected information is structured for easy access. In current self-contained DL models, wherein all the information from both internal (e.g., KB) and/or external sources is incorporated into the parametric memory, the information needs to be actively available as model parameters for computation. The algorithmic time complexity of a self-contained DL model that incorporates all information in its parametric memory is estimated to be greater than $O(n)$, due to the combined effect of including the n information elements, as well as cross-relationships between the information elements. In contrast, in examples disclosed herein, the algorithmic time complexity of the example KBRM system 100 is expected to be $O(\log n)$. In examples disclosed herein, the structured information (entities, facts, concepts, relationships) in the KBRM system 100 resides in the memory of the Deep KB 108 and is only addressed associatively per need. Additionally, in examples disclosed herein, the algorithmic time complexity is expected to have an upper bound of $O(\log n)$, with opportunities to lower it using applicable hashing and indexing techniques, such as those included in the indexed handles 112.

The key role of the NN 104 within the example KBRM system 100 is to learn the functionality and operations required for delivering the AI task results, and the ability to extract required per-query information from the Deep KB 108. In examples disclosed herein, the NN 104 is to perform functions and/or skills. When the ratio of function (operations) volume to all Model Information is very large (e.g., 1:1000), it will benefit the effectiveness of the model to retrieve information from an adjacent Deep KB 108, rather than incorporate it in its parametric memory. The KBRM system 100 approach of separating function from information is expected to be applicable when the semantic space addressable by the workload is large (e.g., in Natural Language Processing (NLP), Visual Scene Understanding and advanced QnA). In contrast, this separation is not recommended for tasks with a low ratio of Function to Model Information such as in syntactic analysis (e.g., named-entity-recognition or part-of-speech tagging).

The exclusion of most of the information from the NN model 104 is expected to yield very substantial reduction in the size of the NN model compared with other self-contained approaches. In examples disclosed herein, it is projected that in some data-rich domains where the distribution of information is very wide, the model reduction could reach 100× or more. This reduction will be achieved on top of other optimization methods such as sparsity, compression, or quantization which address gross model inefficiencies but are limited by the need to keep all the information required for inference within the parametric memory.

In the example KBRM system 100, the embedding and mapping functions included in the indexed handles 112 and the retrieval circuitry 114 are associated primarily with classes (or abstractions) rather than particular individual objects. The NN 104 is trained to handle classes with the ability to pull in the particular instances. For example, in dealing with U.S. history, the KBRM system 100 should effectively address the concepts of State (as a class including Texas, Nevada, Idaho, etc.), of State Governor (as a class including 'James Richard Perry' and 'Arnold Schwarzenegger'), and of calendar dates (e.g., 2000, 2001). Given a subset of the information (e.g., 'Texas' and 'James R. Perry'), it can complete the rest (e.g., the year '2000' to the year '2015' in which Perry was the governor of Texas). In that sense, the latent space is parametrized—i.e., it includes "variable" placeholders (such as a class/generalization/abstraction related to individual entities) that guide the utilization of the particular information that is retrieved from the Deep KB 108 on-the-fly per query.

Figure 2:
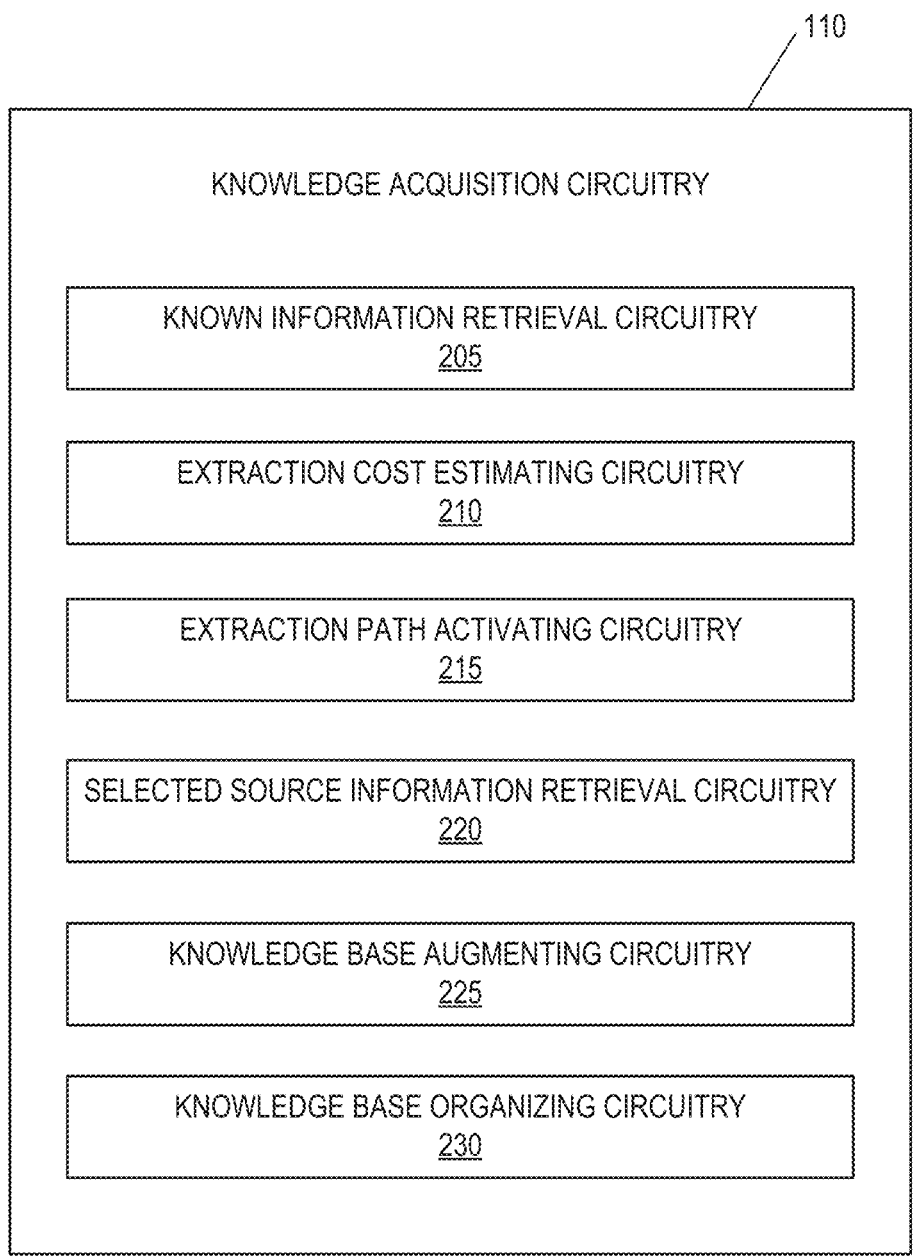
FIG. 2 is block diagram of an example implementation of the knowledge acquisition circuitry of FIG. 1.

FIG. 2 is a block diagram of an example implementation of the knowledge acquisition circuitry 110 of FIG. 1, to operate within the example KBRM system 100 and in conjunction with at least the example external information corpus 116 and the example deep knowledge base 108. The example knowledge acquisition circuitry 110 includes an example known information retrieval circuitry 205, an example extraction cost estimating circuitry 210, an example extraction path activating circuitry 215, an example selected source information retrieval circuitry 220, an example knowledge base augmenting circuitry 225, and an example knowledge base organizing circuitry 230.

The example known information retrieval circuitry 205 extracts the information and/or objects needed from the example input 102 of FIG. 1 to query the model and obtain the information (e.g., from the external information corpus 116 and/or the Deep KB 108 of FIG. 1) to be output as a final result (e.g., output 118 of FIG. 1). Once object extraction from the input 102 has been completed, the known information retrieval circuitry 205 then queries the model (e.g., NN 104 from FIG. 1) and retrieves the desired information from the model if it exists within the model (e.g., the query results in a hit).

In some examples, the knowledge acquisition circuitry 110 of FIGS. 1 and/or 2 includes means for extracting objects from input, querying a model for information, and retrieving the information from the model if it exists. For example, the means for extracting objects from input, querying a model for information, and retrieving the information from the model if it exists may be implemented by the known information retrieval circuitry 205. In some examples, the known information retrieval circuitry 205 may be implemented by machine executable instructions such as that implemented by at least blocks 702, 704, 706, 708 of FIG. 7 and block 605 of FIG. 6 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the known information retrieval circuitry 205 is implemented by other hardware logic circuitry, hardware implemented state machines, and/or any other combination of hardware, software, and/or firmware. For example, the known information retrieval circuitry 205 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example extraction cost estimating circuitry 210 calculates the costs (e.g., runtime cost) associated with retrieving the information, deemed by the known information retrieval circuitry 205 to be missing from the model, from both the external information corpus 116 and the Deep KB 108 of FIG. 1.

In some examples, the knowledge acquisition circuitry 110 of FIGS. 1 and/or 2 includes means for estimating costs associated with extracting desired information from external corpora and the internal knowledge base. For example, the means for estimating costs associated with extracting desired information from external corpora and the internal knowledge base may be implemented by the extraction cost estimating circuitry 210. In some examples, the extraction cost estimating circuitry 210 may be implemented by machine executable instructions such as that implemented by at least blocks 710, 712 of FIG. 7 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the extraction cost estimating circuitry 210 is implemented by other hardware logic circuitry, hardware implemented state machines, and/or any other combination of hardware, software, and/or firmware. For example, the extraction cost estimating circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example extraction path activating circuitry 215 sorts the estimated extraction costs generated by the extraction costs generating circuitry 210 and determines the information source with the lowest associated retrieval cost. In examples disclosed herein, the extraction path activating circuitry 215 sorts the list of estimated extraction costs in ascending order and selects the first information source and its associated extraction cost in the sorted list. However, in other examples, the extraction path activating circuitry 215 may sort the list of estimated extraction costs in descending order, etc. to determine the information source associated with the lowest retrieval cost.

In some examples, the knowledge acquisition circuitry 110 of FIGS. 1 and/or 2 includes means for determining an information source with a lowest associated extraction. For example, the means for means for determining an information source with a lowest associated extraction cost may be implemented by extraction path activating circuitry 215. In some examples, the extraction path activating circuitry 215 may be implemented by machine executable instructions such as that implemented by at least blocks 714, 716, 718, 720 of FIG. 7 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the extraction path activating circuitry 215 is implemented by other hardware logic circuitry, hardware implemented state machines, and/or any other combination of hardware, software, and/or firmware. For example, the extraction path activating circuitry 215 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example selected source information retrieval circuitry 220 receives the identified information source with the lowest extraction cost from the extraction path activating circuitry 210 and queries the selected source for the desired information.

In some examples, the knowledge acquisition circuitry 110 of FIGS. 1 and/or 2 includes means for receiving an identified information source with a lowest associated extraction cost and querying the selected source for desired information. For example, the means for receiving an identified information source with a lowest associated extraction cost and querying the selected source for desired information may be implemented by selected source information retrieval circuitry 220. In some examples, the selected source information retrieval circuitry 220 may be implemented by machine executable instructions such as that implemented by at least blocks 722, 724, 726, 728 of FIG. 7 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the selected source information retrieval circuitry 220 is implemented by other hardware logic circuitry, hardware implemented state machines, and/or any other combination of hardware, software, and/or firmware. For example, the selected source information retrieval circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example knowledge base augmenting circuitry 225 determines whether the intended information (e.g., result) was retrieved from an external source. If so, the knowledge base augmenting circuitry 225 stores the object information in the knowledge base (e.g., Deep KB 108 of FIG. 1) of the model (e.g., NN 104 of FIG. 1).

In some examples, the knowledge acquisition circuitry 110 of FIGS. 1 and/or 2 includes means for determining whether the retrieved result was obtained from an external information source, and in response to establishing that it was, storing the retrieved object information in the knowledge base. For example, the means for determining whether the retrieved result was obtained from an external information source, and in response to establishing that it was, storing the retrieved object information in the knowledge base may be implemented by knowledge base augmenting circuitry 225. In some examples, the knowledge base augmenting circuitry 225 may be implemented by machine executable instructions such as that implemented by at least blocks 730, 732 of FIG. 7 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the knowledge base augmenting circuitry 225 is implemented by other hardware logic circuitry, hardware implemented state machines, and/or any other combination of hardware, software, and/or firmware. For example, the knowledge base augmenting circuitry 225 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example knowledge base organizing circuitry 230 structures the newly-added information in the knowledge base (e.g., Deep KB 108 of FIG. 1) of the model, using algorithms such as caching, indexing, hashing, etc. in order to provide a structure for the information contained therein.

In some examples, the knowledge acquisition circuitry 110 of FIGS. 1 and/or 2 includes means for structuring the newly-added information in the knowledge base for easy access. For example, the means for structuring the newly-added information in the knowledge base for easy access may be implemented by knowledge base organizing circuitry 230. In some examples, the knowledge base organizing circuitry 230 may be implemented by machine executable instructions such as that implemented by at least blocks 734, 736 of FIG. 7 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the knowledge base organizing circuitry 230 is implemented by other hardware logic circuitry, hardware implemented state machines, and/or any other combination of hardware, software, and/or firmware. For example, the knowledge base organizing circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 3:
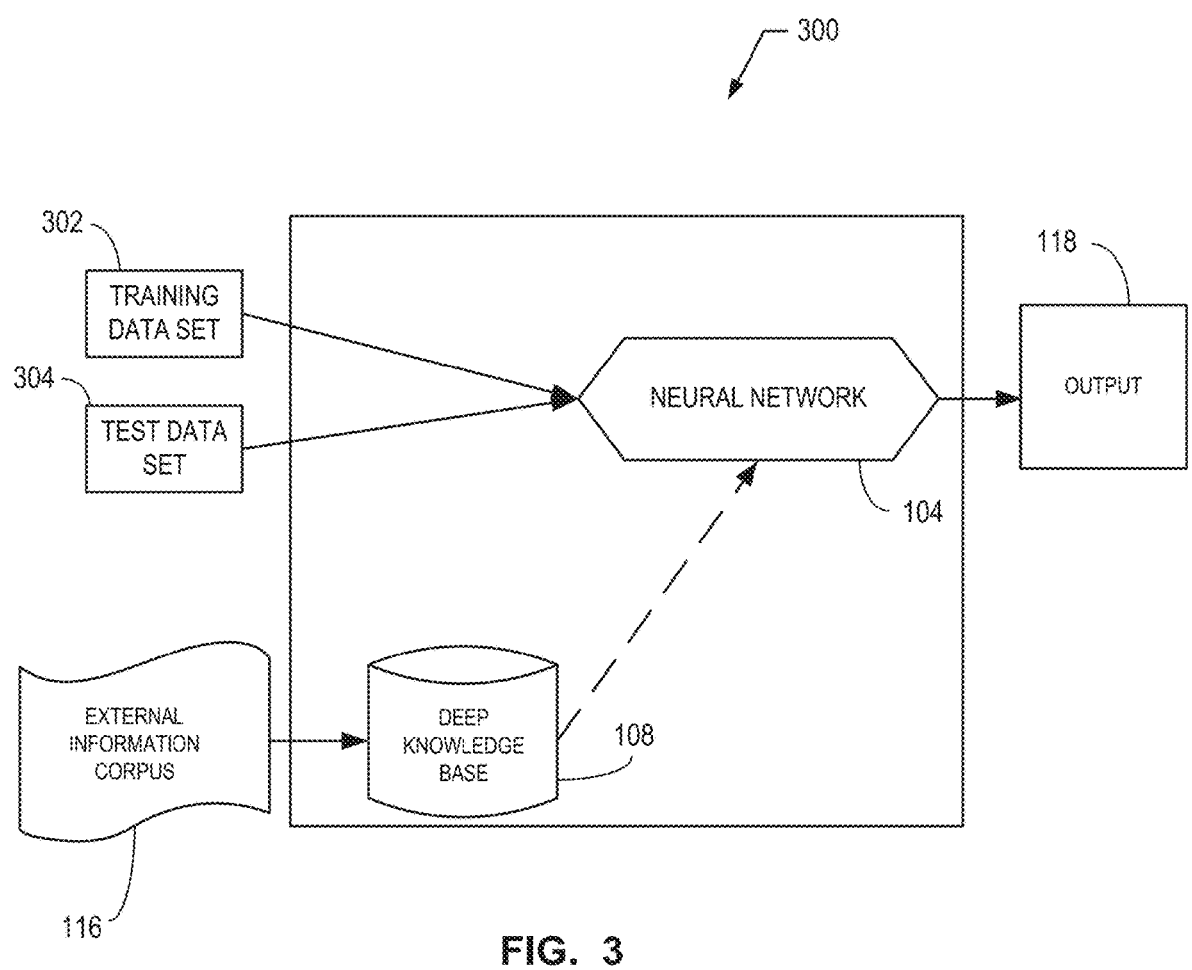
FIG. 3 is a block diagram illustrating Neural Network training and Knowledge-Based co-optimization of FIG. 1.

FIG. 3 is a block diagram illustrating Neural Network training and Knowledge-Based co-optimization, implemented in accordance with the teachings of this disclosure and the KBRM system 100 of FIG. 1.

The example NN training system 300 includes an example training data set 302 and an example test data set 304, and the example refactored neural network (NN) 104, the external information corpus 116, the deep knowledge base (KB) 108, and the output 118 of FIG. 1.

Preparation of the KBRM system 100 of FIG. 1 requires a combined refactored NN 104 training and deep KB 108 enhancement. In examples disclosed herein, the deep KB 108 includes both specific facts and relations as well as their classes and abstractions. Training is strongly guided to identify and learn classes/abstractions, plus the ability to extract the particular instances from the deep KB 108. For example, when provided with a question "When was Perry the governor of Texas?" as input (e.g., input 102 of FIG. 1), the refactored NN 104 should parse the question, identify 'Perry' as the entity 'James R. Perry', 'Texas' as a US State, and 'governor' as a political post. The NN 104 learns to complete the rest (e.g., the start year as '2000' and end year as '2015') from the deep KB 108.

The deep KB 108 is generated from and/or trained using larger sources of information, be it an unstructured source (like plaintext Wikipedia), a structured source (like ConceptNet or WikiData), or extracted out of parametric language models (e.g., COMET). During the preparation and/or training of the NN 104 model, the deep KB 108 will be enhanced to create a complete ontology of the known target domains with emphasis on classes, abstractions and relationships. In examples disclosed herein, the deep KB 108 does not need to contain a complete set of data reflecting the domains during inference, but rather all the classes, abstractions and relationships that are required to train the refactored NN 104 model functions.

In examples disclosed herein, training of both the refactored NN 104 and/or the deep KB 108 utilizes a retrieval scheme and an information source that corresponds to the retrieval and information source that will be used during inference (e.g., deep KB 108, external information corpus 116). The refactored NN 104 is trained to maintain an ability to function on abstractions and on retrieval of the appropriate specific values. In examples disclosed herein, however, the training environment does not need to include all the data that will be used during inference.

During inference, the refactored NN 104 and deep KB 108 operate in tandem, with the refactored NN 104 applying the learned functionality and mapping, and the deep KB 108 providing all the needed particulars. As long as the functions and tasks are similar, new information in the deep KB 108 can be processed effectively, regardless of its presence in the training data set 302. For example, in examples disclosed herein, if the deep KB 108 is provided information about states in Mexico and their respective governors, the KBRM system 100 of FIG. 1 can effectively provide information on 'Jaime Bonilla Valdez' as the governor of 'Baja California' even if Mexico's information was not present during training and was only made available during inference.

Figure 4:
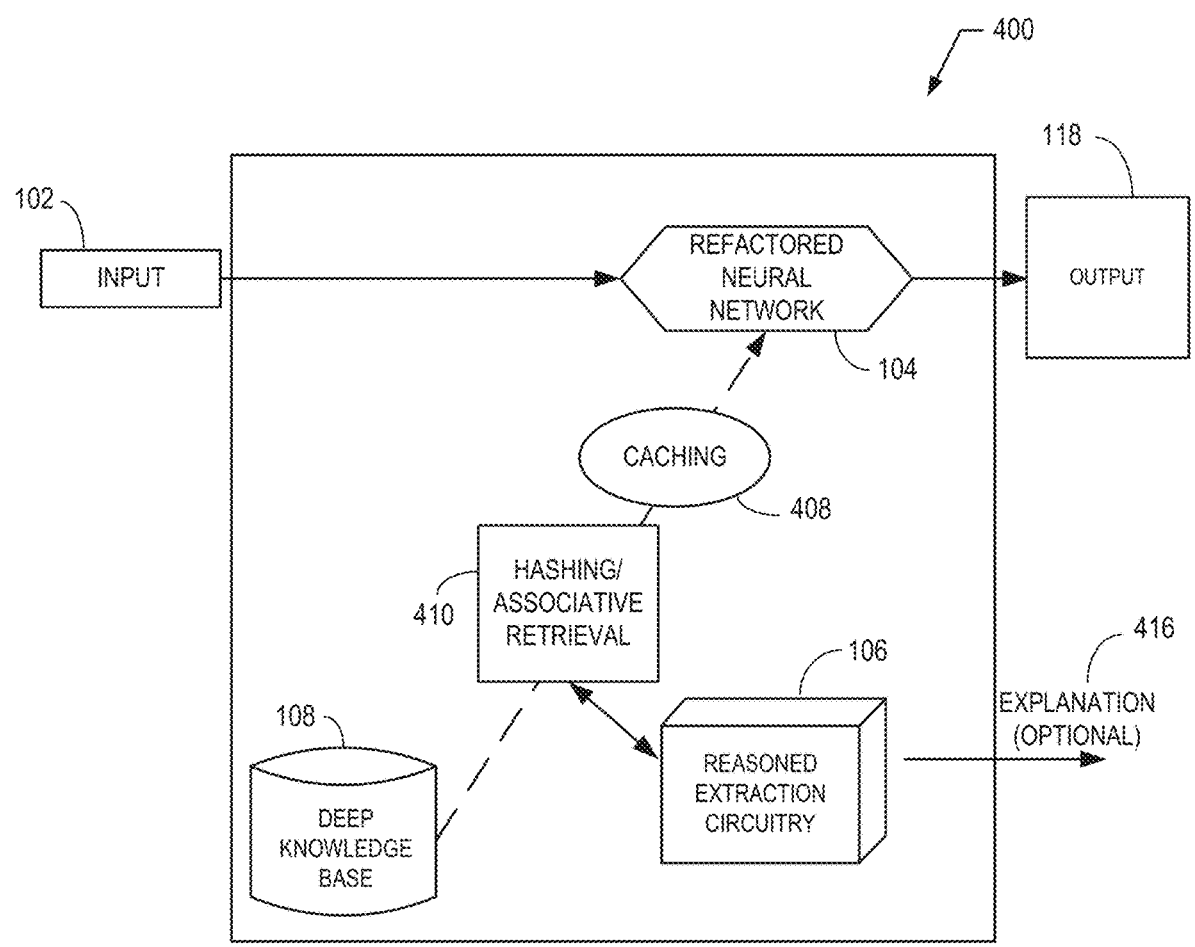
FIG. 4 is a block diagram of an example configuration of a hardware-accelerated KBRM system.

FIG. 4 is a block diagram of an example configuration of a hardware-accelerated KBRM system 400. The example hardware-accelerated KBRM system 400 includes an example caching module 408, an example hashing and/or associative retrieval module 410, and an example explanation 416, and the input 102, the reasoned extraction circuitry 106, the deep knowledge base (KB) 108, the example refactored neural network (NN) 104, and the example output 118 of FIG. 1.

Refactoring of the NN model 104 shifts most of the information outside the model (non-parametric memory) to be retrieved during inference. This substantially reduces the NN 104 model size for data-rich domains and shifts cycles and value from massive tensor structures to integrated retrieval systems. The compute and power efficiency of a KBRM system (e.g., KBRM system 100, hardware-accelerated KBRM system 400) is dependent on efficient per-query associative access and retrieval from an arbitrarily large memory. The level of overall optimization between algorithm, software (SW), and hardware (HW) plays a major role in the efficiency of the system during inference. The mix of types of compute between scalar, vector and tensor operations is much more balanced than in current large DL non-factored models and therefore stands to benefit from a CPU, XPU and memory-optimized system solution.

Further optimization of performance is achieved by an efficient associative access mechanism, using hashing techniques, such as the hashing and/or associative retrieval module 410. Due to the locality of information in many expected usages, the caching module 408 provides high value by bringing data closer to the NN 104 for subsequent retrievals in a similar area of the deep KB 1080. In examples disclosed herein, leveraging similarity-based extraction from persistent memory (e.g., Optane) provides stable physical access and therefore reduces latency and reducing power consumption.

The reasoned extraction circuitry 106 within the hardware-accelerated KBRM system 400 provides an optional output of explanation 416, providing information regarding information retrieval paths, etc.

FIG. 5 is a table 500 illustrating a comparison of features of the KBRM system 100 of FIG. 1 with that of previous approaches. The table 500 includes previous approaches such as Retrieval-Augmented Generation (RAG) 504, Entities as Experts (EaE) 506, Efficient-Bidirectional Encoder Representations from Transformers (E-BERT) 508, k-Nearest Neighbor Language Model (kNN-LM) 510, and ERNIE 512.

Retrieval-Augmented Generation (RAG) 504 uses Dense Passage Retrieval (DPR) to retrieve the top-K matches from Wikipedia passages for a query. The input query, as well as the Wikipedia passages, are represented through dense embeddings created by transformer models, and the product of these embeddings is used as a similarity scoring function. The text of the retrieved passages is used as additional context by a generative Language Model (LM) (e.g., BERT) to answer the query.

Entities as Experts (EaE) 506 introduces a concept of entity memories within the transformer model architecture. Along with the standard token vocabulary of 30,000 tokens (similar to BERT), EaE also has a 1 million entity vocabulary. The embeddings of the entities and their retrieval from the entity memory is trained along with the full transformer model.

E-BERT 508 introduces entity embeddings from an external source (e.g., Wikipedia2vec) and aligns these entity vectors with BERT's WordPiece vectors at the beginning of BERT.

k-Nearest Neighbor Language Model (kNN-LM) 510 introduces an additional component to a language model, which involves retrieval of the k most similar contexts from a datastore along with corresponding targets. Instead of re-training on new data, embeddings of new contexts and targets are created which can be added to the datastore, which can then be retrieved at inference time.

ERNIE 512 introduces a knowledge encoder on top of a textual encoder which is identical to BERT. In the knowledge encoder, information fusion takes place between token embeddings and entity embeddings which are obtained from a Knowledge Graph (KG).

The first row 516 of the table 500 includes the design feature of a self-contained system which includes a tightly integrated NN (e.g., NN 104 of FIG. 1), KB (e.g., deep KB 108 of FIG. 1), and R&E module (e.g., reasoned extraction circuitry 106 of FIG. 1). As shown in the table 500, RAG 504, EaE 506, E-BERT 508, kNN-LM 510, and ERNIE 512 do not possess such a design solution, however, the KBRM system 100 does.

The second row 518 describes the design feature of a KB that incorporates information aggregated and consolidated from multiple sources in a structured knowledge graph (KG) of data elements, relationships, etc. between elements and classes and/or abstractions. As shown in the table 500, RAG 504, EaE 506, E-BERT 508, kNN-LM 510, and ERNIE 512 do not possess such a design solution, however, the KBRM system 100 does.

The third row 520 of the table 500 describes the design feature of having a vast majority of model information reside in the KB, rather than the NN. As shown in the table 500, RAG 504, EaE 506, E-BERT 508, kNN-LM 510, and ERNIE 512 do not possess such a design solution, however, the KBRM system 100 does.

The fourth row 522 of the table 500 describes the design feature of a KB that can include new and/or additional information during inference. As shown in the table 500, EaE 506, E-BERT 508, and ERNIE 512 do not possess such a design solution, however, RAG 504, kNN-LM 510, and the KBRM system 100 do.

The fifth row 524 of the table 500 describes the design feature of an NN that is trained together with its KB, focusing on learning at the highest abstraction (most general) level available at the KB. As shown in the table 500, RAG 504, EaE 506, E-BERT 508, kNN-LM 510, and ERNIE 512 do not possess such a design solution, however, the KBRM system 100 does.

The sixth row 526 of the table 500 describes the design feature of an NN that extracts specifics (e.g., data items, relationships attributes, etc.) from the KB for each forward propagation (F-PROP) in both training and inference stages. As shown in the table 500, RAG 504, EaE 506, E-BERT 508, kNN-LM 510, and ERNIE 512 do not possess such a design solution, however, the KBRM system 100 does.

The seventh row 528 of the table 500 describes the design feature of an explainability ("R&E") module (e.g., reasoned extraction circuitry 106 of FIG. 1), module that tracks and reports out the particular information and KB path used per inference. As shown in the table 500, EaE 506, E-BERT 508, kNN-LM 510, and ERNIE 512 do not possess such a design solution, however, RAG 504 and the KBRM system 100 do.

The eighth row 530 of the table 500 describes the design feature of a tuned hardware (HW) architecture that greatly improves latency and power per query (e.g., F-PROP) through integration of large associative memory, hashing for efficient physical access, and caching for rapid access to related information. As shown in the table 500, RAG 504, EaE 506, E-BERT 508, kNN-LM 510, and ERNIE 512 do not possess such a design solution, however, the KBRM system 100 does.

While an example manner of implementing the knowledge acquisition circuitry 110 of FIG. 1 is illustrated in FIG. 2, one or more of the elements, processes and/or devices illustrated in FIG. 2 may be combined, divided, re-arranged, omitted, eliminated and/or implemented in any other way. Further, the example known information retrieval circuitry 205, example extraction cost estimating circuitry 210, example extraction path activating circuitry 215, example selected source information retrieval circuitry 220, example knowledge base augmenting circuitry 225, example knowledge base organizing circuitry 230, and/or, more generally, the example knowledge acquisition circuitry 110 f FIG. 1 may be implemented by hardware, software, firmware and/or any combination of hardware, software and/or firmware. Thus, for example, any of the example known information retrieval circuitry 205, example extraction cost estimating circuitry 210, example extraction path activating circuitry 215, example selected source information retrieval circuitry 220, example knowledge base augmenting circuitry 225, example knowledge base organizing circuitry 230 and/or, more generally, the example knowledge acquisition circuitry 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the the example known information retrieval circuitry 205, example extraction cost estimating circuitry 210, example extraction path activating circuitry 215, example selected source information retrieval circuitry 220, example knowledge base augmenting circuitry 225, and example knowledge base organizing circuitry 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example knowledge acquisition circuitry 110 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic circuitry, machine readable instructions, hardware implemented state machines, and/or any combination thereof for implementing the knowledge acquisition circuitry 110 of FIGS. 1 and/or 2 is shown in FIG. 4. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6-7, many other methods of implementing the example knowledge acquisition circuitry 110 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 6:
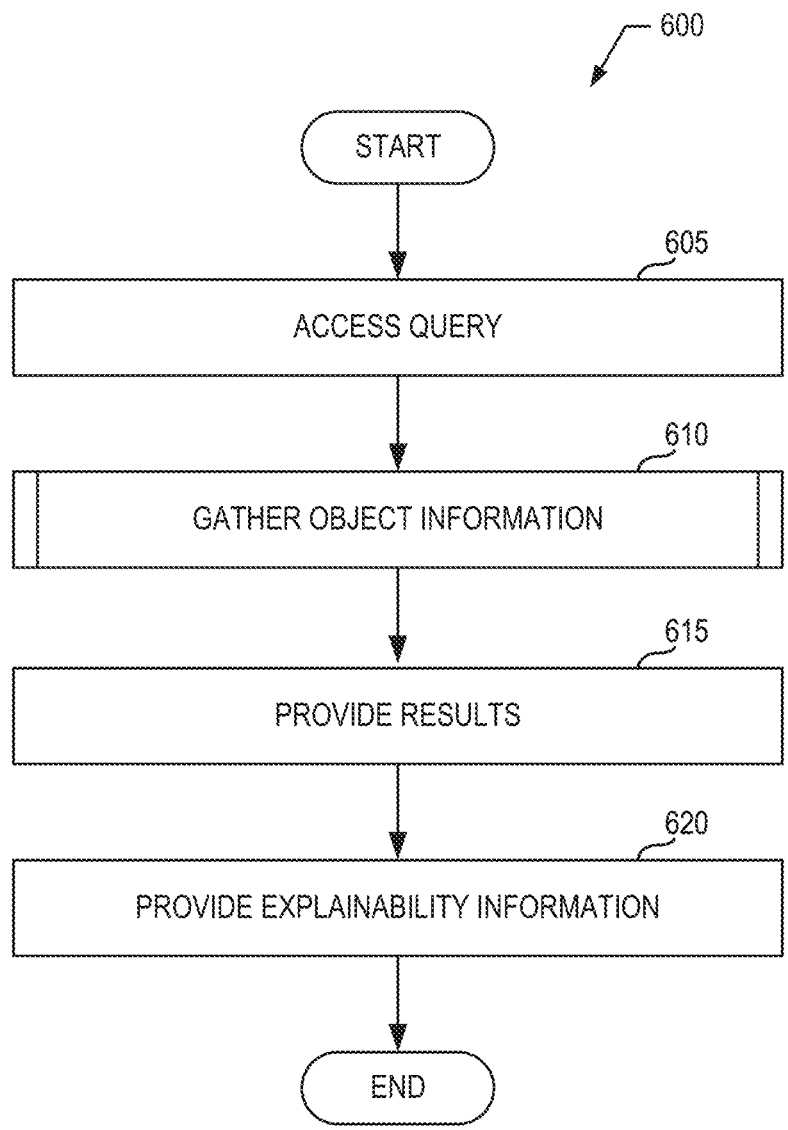
FIGS. 6-7 are flowcharts representative of machine-readable instructions that may be executed by example processor circuitry to implement the example knowledge acquisition circuitry of FIGS. 1 and/or 2, in accordance with the teachings of this disclosure.

FIG. 6 is a flowchart representative of example machine readable instructions and/or example operations 600 that may be executed and/or instantiated by processor circuitry to access a query, gather object information, provide results, and output explainability information. The machine readable instructions and/or operations 600 of FIG. 6 begin at block 605, at which the known information retrieval circuitry 205 access the query for extraction.

As illustrated in FIG. 6, at block 605, the known information retrieval circuitry 205 accesses the query (e.g., input 102 from FIG. 1) for extraction. From the query, the known information retrieval circuitry 205 extracts information needed to produce the query result. For example, when provided with the question "When was Perry the governor of Texas?" as input (e.g., input 102 of FIG. 1), the known information retrieval circuitry 205 parses the question and extracts and/or identifies 'Perry' as the entity 'James R. Perry', 'Texas' as a US State, and 'governor' as a political post.

At block 610, the knowledge acquisition circuitry 110 of FIG. 1 gathers object information from an information source (e.g., NN model 104, deep KB 108, external information corpus 116). An example process for gathering object information is described in conjunction with FIG. 7.

At block 615, the selected source information retrieval circuitry 220 provides the results of the object information gathered by the knowledge acquisition circuitry 110 of block 610.

At block 620, the reasoned extraction circuitry 106 of FIG. 1 provides explainability information, including the particular information and knowledge base (KB) path used for each inference.

Figure 7:
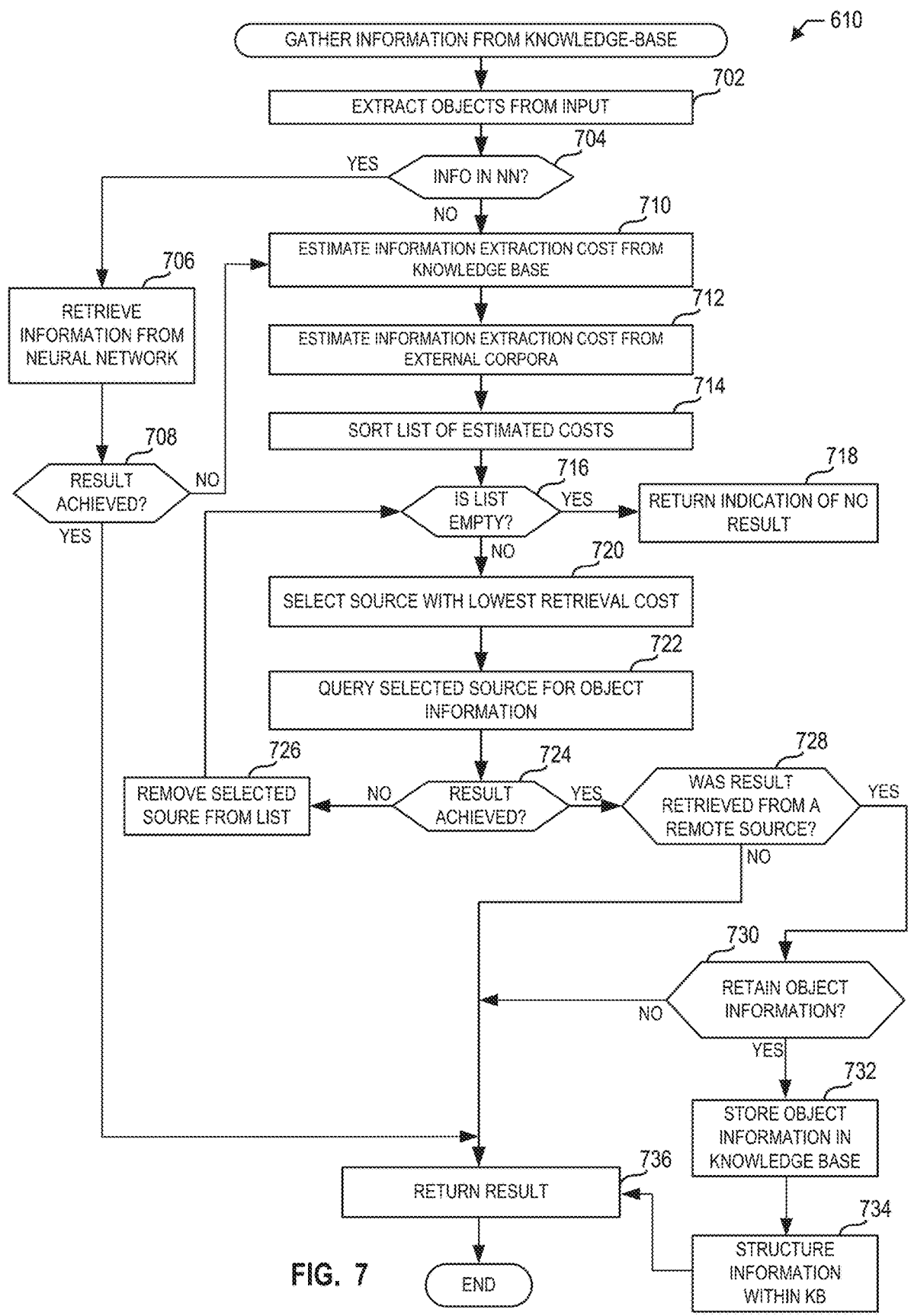

FIG. 7 is a flowchart representative of example machine readable instructions and/or example operations which may be executed to implement block 610 of FIG. 6 to gather information from the knowledge base (KB).

As illustrated in FIG. 7, at block 702, the known information retrieval circuitry 205 extract objects from the input (e.g., input 102 of FIG. 1) in order to determine which information is needed to supply an answer. For example, when provided with the question "When was Perry the governor of Texas?" as input (e.g., input 102 of FIG. 1), the known information retrieval circuitry 205 parses the question and extracts and/or identifies 'Perry' as the entity 'James R. Perry', 'Texas' as a US State, and 'governor' as a political post.

At block 704, the known information retrieval circuitry 205 queries the model (e.g., NN model 104 of FIG. 1) to check if the desired information is stored therein. If the known information retrieval circuitry 205 determines that the desired information is stored within the NN, the process moves forward to block 706. However, if the known information retrieval circuitry 205 establishes that the desired information is not located within the NN, the process moves to block 710.

At block 706, after determining that the desired information is stored within the NN, the known information retrieval circuitry 205 retrieves the information from the neural network (e.g., NN 104 from FIG. 1).

At block 708, the known information retrieval circuitry 205 checks whether the desired result was achieved (e.g., an answer to the input query is ready to be output). If the known information retrieval circuitry 205 establishes that the desired result was achieved, the process moves to block 736. However, if the known information retrieval circuitry 205 determines that the desired result was not achieved, the process moves to block 710.

At block 710, the extraction cost estimating circuitry 210 estimates the information extraction cost from the knowledge base (e.g., deep KB 108 of FIG. 1). In examples disclosed herein, the extraction cost estimating circuitry 210 estimates the information extraction cost from the knowledge base by estimating an expected amount of retrieval time for information from the knowledge base (e.g., a temporal cost). However, in other examples, any other type of cost estimation could additionally or alternatively be used (e.g., an amount of computational resources used to obtain the requested information from the knowledge base).

At block 712, the extraction cost estimating circuitry 210 estimates the information extraction cost from external corpora (e.g., external information corpus 116 of FIG. 1). In examples disclosed herein, the extraction cost estimating circuitry 210 estimates the information extraction cost from external corpora by estimating an expected amount of retrieval time for information from the external corpora (e.g., a temporal cost). However, in other examples, any other type of cost estimation could additionally or alterna- tively be used (e.g., an amount of computational resources used to obtain the requested information from the external corpora).

At block 714, the extraction path activating circuitry 215 sorts the list of estimated costs calculated by the extraction cost estimating circuitry 210 and associated with each possible extraction path (e.g., path from KB, path from external corpora). In examples disclosed herein, the list of estimated costs and their associated information sources are sorted in ascending and/or descending order, with the information source yielding the lowest extraction cost being the most desirable.

At block 716, the extraction path activating circuitry 215 determines whether the list of possible information sources is empty. If the extraction path activating circuitry 215 determines that the list of information sources is empty, the process moves to block 718. However, if the extraction path activating circuitry 215 establishes that the list of information sources is not empty, the process moves forward to block 720.

At block 718, the extraction path activating circuitry 215 returns an indication of no result, since the list of possible information sources wherein the desired information could be gathered has been determined to be empty.

At block 720, the extraction path activating circuitry 215 parses the list of information sources, sorted by their respective extraction costs and selects an information source. In examples disclosed herein, the information source with the lowest associated retrieval cost (i.e., extraction cost) is selected. However, the selection may be based on any other criteria such as, for example, a veracity of the information source. For example, information sources with information more likely to be true may be selected over information sources that are more prone to false information.

At block 722, the selected source information retrieval circuitry 220 the selected information source (as determined by the extraction path activating circuitry 215) is queried to gather the desired information.

At block 724, the selected source information retrieval circuitry 220 determines, similar to block 708, whether the desired query result was achieved. If the selected source information retrieval circuitry 220 establishes that the desired result was achieved, the process moves forward to block 728. However, if the selected source information retrieval circuitry 220 determines that the desired result was not achieved, the process moves to block 726.

At block 726, the selected source information retrieval circuitry 220 removes the selected source from the list of available information sources and their associated extraction costs and proceeds back to block 716 wherein the extraction path activating circuitry 215 checks if the list of information sources wherein the desired information may be contained is empty.

At block 728, the selected source information retrieval circuitry 220 determines whether the desired result, as queried and obtained by the selected source information retrieving circuitry 220 in blocks 722 and 744, was retrieved from a remote source (e.g., external information corpus 116 of FIG. 1).

At block 730, the knowledge base augmenting circuitry 225 determines whether the collected object information is to be retained in the knowledge base of the model. If the knowledge base augmenting circuitry 225 establishes that the newly-gathered object information is to be retained, the process moves forward to block 732. However, if the knowledge base augmenting circuitry 225 determines that the collected object information is not to be retained in the local knowledge base, the process moves to block 736.

At block 732, the knowledge base augmenting circuitry 225 stores the gathered object information in the knowledge base (e.g., deep KB 108 of FIG. 1).

At block 734, the knowledge base organizing circuitry 230 organizes and/or structures the newly-gathered information using a variety of organizational algorithms (e.g., hashing, caching, indexing, etc.) in order to promote easy access during future use.

At block 736, the knowledge base organizing circuitry 230 returns the result of the query (e.g., information gathered in response to input). In examples disclosed herein, the result includes the answer to the input query along with an explanation of how the result was achieved (e.g., information extraction path).

Figure 8:
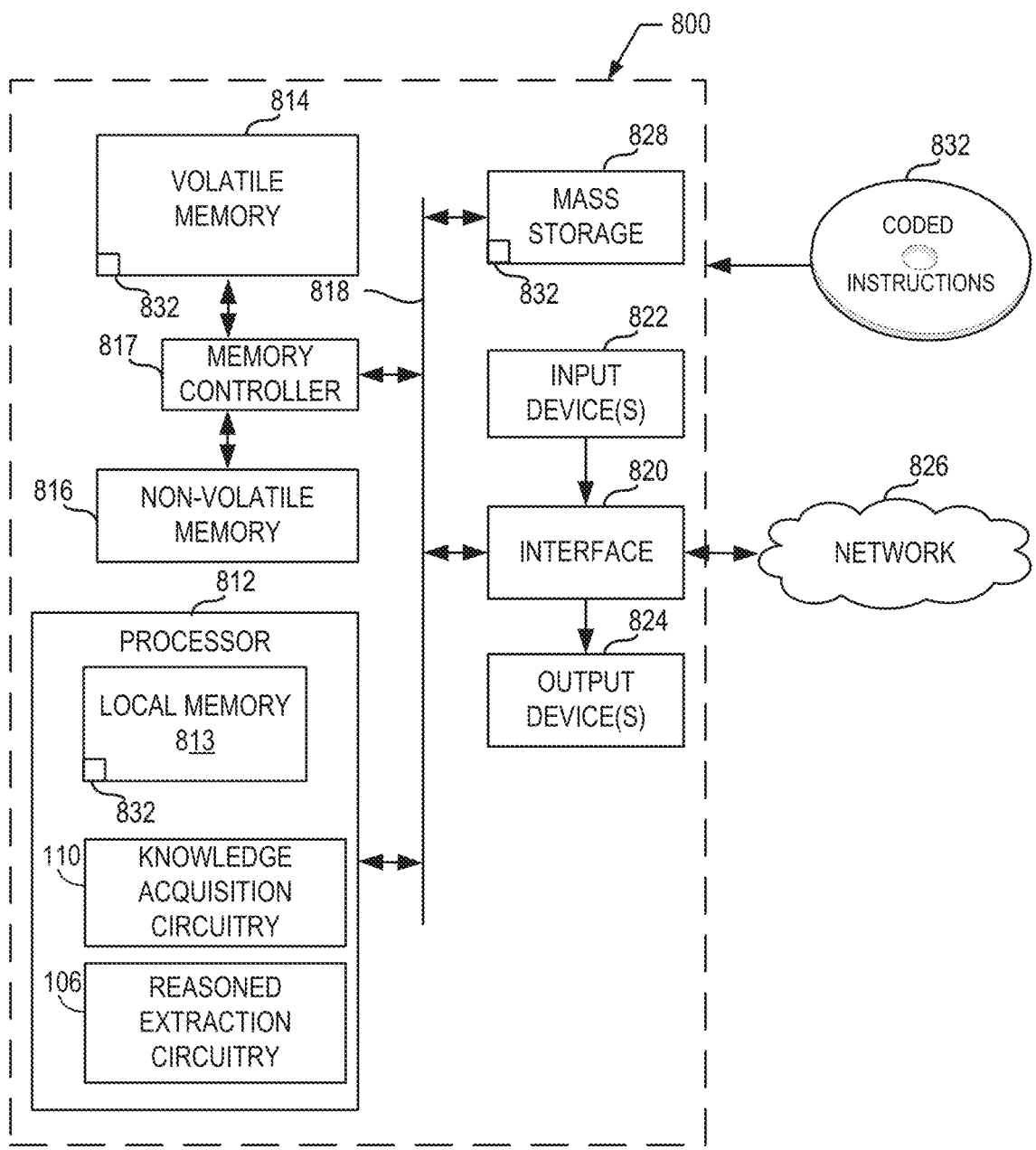
FIG. 8 is a block diagram of an example processing platform including processor circuitry structured to execute the example machine readable instructions of FIGS. 6-7 to implement the knowledge acquisition circuitry 110 of FIG. 2.

FIG. 8 is a block diagram of an example processor platform 800 structured to execute and/or instantiate the machine readable instructions and/or operations of FIGS. 6-7 to implement the knowledge acquisition circuitry 110 of FIGS. 1 and/or 2 The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 825. The processor circuitry 825 of the illustrated example is hardware. For example, the processor circuitry 825 can be implemented by one or more integrated circuits, logic circuits, FPGAs microprocessors, CPUs, GPUs, DSPs, and/or microcontrollers from any desired family or manufacturer. The processor circuitry 825 may be implemented by one or more semiconductor based (e.g., silicon based) devices. In this example, the processor circuitry 825 implements the example knowledge acquisition circuitry 110, including the example known information retrieval circuitry 205, the example extraction cost estimating circuitry 210, the example extraction path activating circuitry 215, the example selected source information retrieval circuitry 220, the example knowledge base augmenting circuitry 225, and the example knowledge base organizing circuitry 230.

The processor circuitry 825 of the illustrated example includes a local memory 805 (e.g., a cache, registers, etc.). The processor circuitry 825 of the illustrated example is in communication with a main memory including a volatile memory 815 and a non-volatile memory 820 by a bus 830. The volatile memory 815 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 820 may be implemented by flash memory and/or any other desired type of memory device. Access to the main memory 815, 820 of the illustrated example is controlled by a memory controller 817.

The processor platform 800 of the illustrated example also includes interface circuitry 845. The interface circuitry 845 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 840 are connected to the interface circuitry 845. The input device(s) 840 permit(s) a user to enter data and/or commands into the processor circuitry 825. The input device(s) 840 can be implemented by, for example, an audio sensor, a microphone, a camera (still or video), a keyboard, a button, a mouse, a touchscreen, a track-pad, a trackball, an isopoint device, and/or a voice recognition system.

One or more output devices 850 are also connected to the interface circuitry 845 of the illustrated example. The output devices 850 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 845 of the illustrated example, thus, typically includes a graphics driver card, a graphics driver chip, and/or graphics processor circuitry such as a GPU.

The interface circuitry 845 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 810. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 835 to store software and/or data. Examples of such mass storage devices 835 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 805, which may be implemented by the machine readable instructions of FIGS. 6-7, may be stored in the mass storage device 835, in the volatile memory 815, in the non-volatile memory 820, and/or on a removable non-transitory computer readable storage medium such as a CD or DVD.

Figure 9:
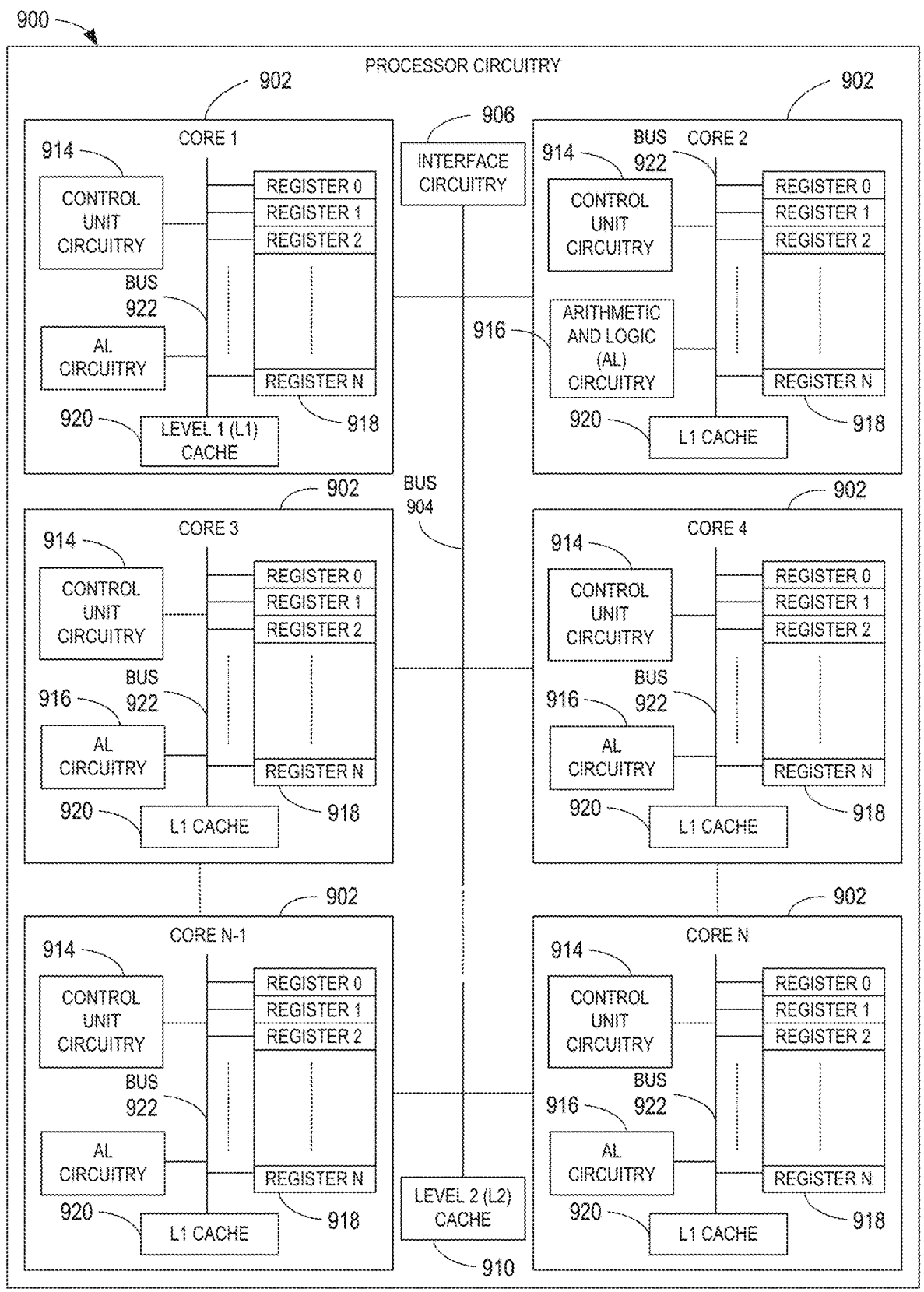
FIG. 9 is a block diagram of an example implementation of the processor circuitry of FIG. 8.

FIG. 9 is a block diagram of an example implementation of the processor circuitry 825 of FIG. 8. In this example, the processor circuitry 825 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIGS. 6-7.

The cores 902 may communicate by an example first bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 815, 820 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general puspose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
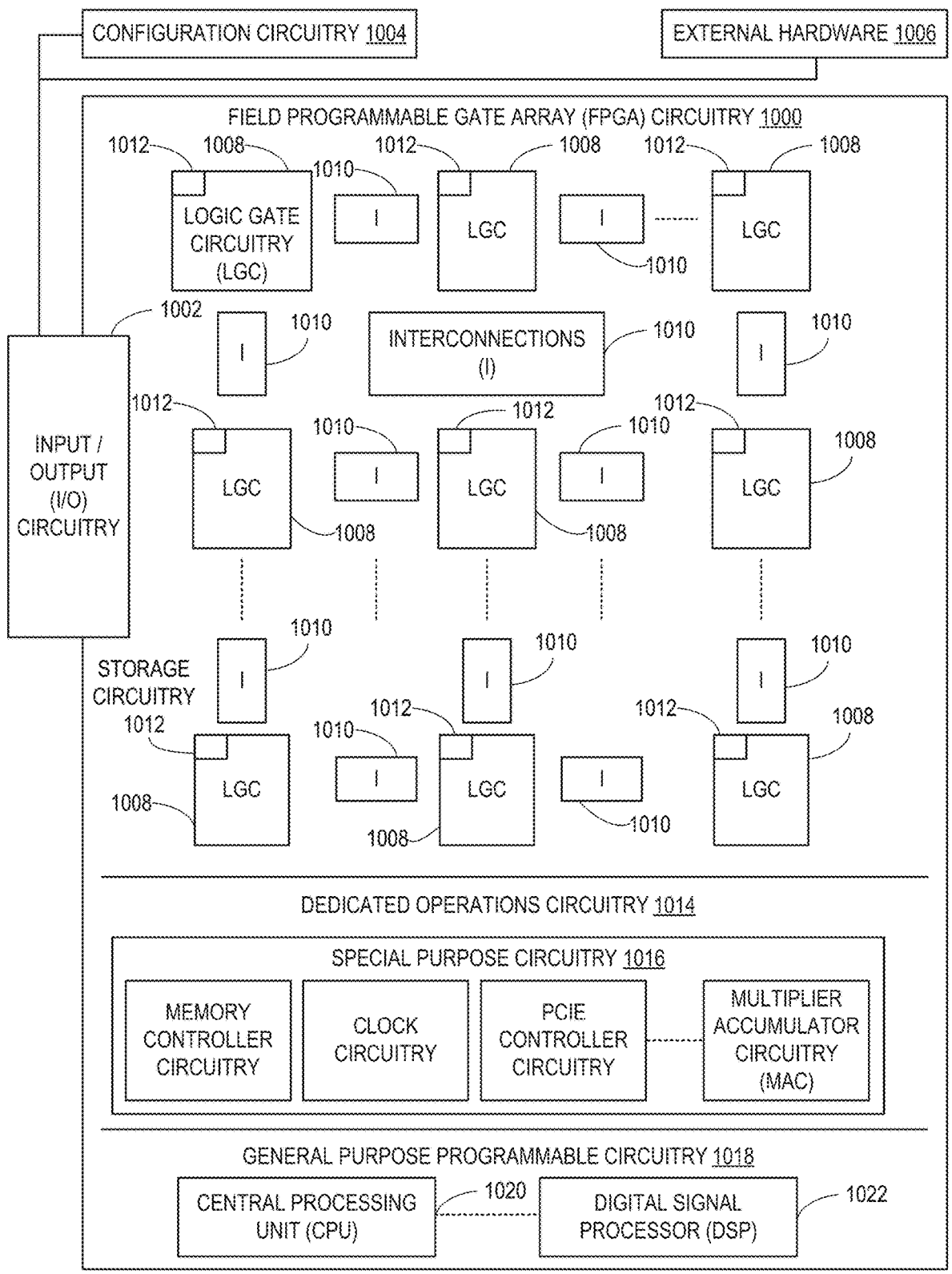
FIG. 10 is a block diagram of another example implementation of the processor circuitry of FIG. 8.

FIG. 10 is a block diagram of another example implementation of the processor circuitry 825 of FIG. 8. In this example, the processor circuitry 825 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 6-7 In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6-7. As such, the FPGA circuitry 1000 may be structured to effectively instantiate some or all of the machine readable instructions of the flowcharts of FIGS. 6-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 6-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 6-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 825 of FIG. 8, many other approaches are contemplated. For example, as mentioned above, modern FPGA circuitry may include an on-board CPU, such as one or more of the example CPU 1020 of FIG. 10. Therefore, the processor circuitry 825 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6-7 may be executed by one or more of the cores 902 of FIG. 9 and a second portion of the machine readable instructions represented by the flowcharts of FIGS. 6-7 may be executed by the FPGA circuitry 1000 of FIG. 10.

In some examples, the processor circuitry 825 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 825 of FIG. 8, which may be in one or more packages. For example, the XPU may include a CPU in one package, a DSP in another package, a GPU in yet another package, and an FPGA in still yet another package.

Figure 11:
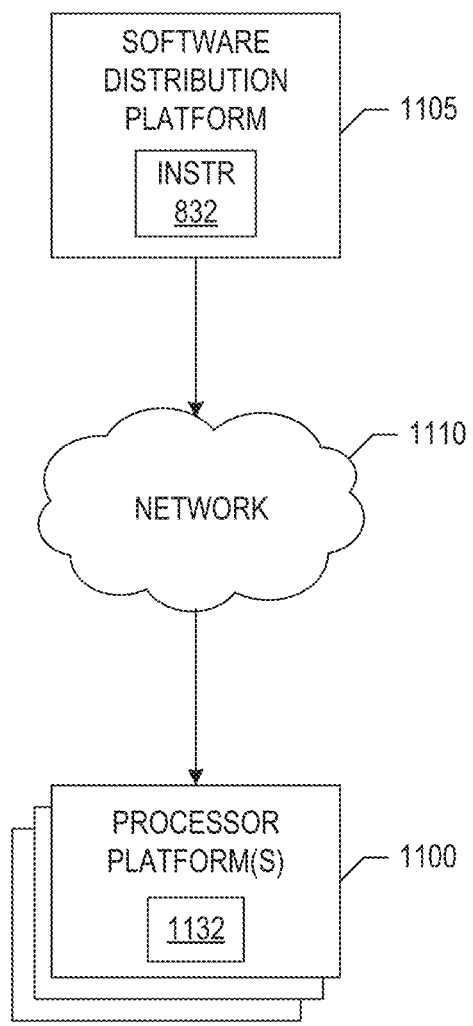
FIG. 11 is a block diagram of an example software distribution platform (e.g., one or more servers) to distribute software (e.g., software corresponding to the example machine readable instructions of FIGS. 6-7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 1132 of FIG. 11 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions represented by the flowcharts of FIGS. 6-7. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 1132, which may correspond to the example machine readable instructions represented by the flowcharts of FIGS. 6-7, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1105. For example, the software, which may correspond to the example machine readable instructions represented by the flowcharts of FIGS. 6-7 may be downloaded to the example processor platform 1100, which is to execute the machine readable instructions 1132 to implement the knowledge acquisition circuitry 110 of FIGS. 1 and/or 2. In some example, one or more servers of the software distribution platform 1105 periodically offer, transmit, and/or force updates to the software (e.g., the example machine readable instructions 1132 of FIG. 11) to ensure improvements, patches, updates, etc., are distributed and applied to the software at the end user devices.

Example methods, apparatus, systems, and articles of manufacture for a knowledge-based deep learning refactoring model with tightly integrated functional nonparametric memory are disclosed herein. Further examples and combinations thereof include the following:

Example 1 includes an apparatus for a knowledge-based deep learning refactoring model comprising interface circuitry, processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations or the third operations to instantiate extraction cost estimating circuitry to estimate a first information extraction cost corresponding to retrieval of information from a local knowledge base, the extraction cost estimating circuitry to estimate a second information extraction cost corresponding retrieval of information from a remote knowledge base, extraction path activating circuitry to select an information source based on the first and second estimated information extraction costs, selected source information retrieval circuitry to query the selected information source, and return the queried information, knowledge base augmenting circuitry to in response to a determination that the selected information source was an external information source, store the queried information in the local knowledge base, and knowledge base organizing circuitry to organize the stored information in the local knowledge base.

Example 2 includes the apparatus of example 1, wherein known information retrieval circuitry is to determine whether a result information is stored within a neural network model by querying the neural network model for the result information, and in response to determining that the result information is stored within a neural network model, extract the information from the neural network model.

Example 3 includes the apparatus of example 1, wherein the extraction cost estimating circuitry is to further estimate a third information extraction cost corresponding to retrieval of information from third information source, the third information extraction cost added to a plurality of information costs including one or more of a first and second information extraction cost.

Example 4 includes the apparatus of example 3, wherein extraction path activating circuitry is to further sort the plurality of information extraction costs to determine an information source associated with a minimum information extraction cost of the plurality of information extraction costs.

Example 5 includes the apparatus of example 1, wherein the extraction cost estimating circuitry is to calculate a first and second information extraction cost by estimating an expected amount of retrieval time for information from an information source.

Example 6 includes the apparatus of example 1, wherein the extraction path activating circuitry is to select the information source to be queried based on a minimum associated extraction cost of a sorted plurality of information costs.

Example 7 includes the apparatus of example 1, wherein the knowledge base organizing circuitry is to structure stored information in a local knowledge base using one or more of a hashing, caching, and indexing algorithm.

Example 8 includes the apparatus of example 1, wherein the knowledge base organizing circuitry is further to return explainability information corresponding to an extraction path with the queried information.

Example 9 includes a method to perform information retrieval, the method comprising estimating a first information extraction cost corresponding to retrieval of information from a local knowledge base, estimating a second information extraction cost corresponding retrieval of information from a remote knowledge base, selecting an information source based on the first and second estimated information extraction costs, querying the selected information source, in response to determining that the selected information source was an external information source, storing the queried information in the local knowledge base, organizing the stored information in the local knowledge base, and returning the queried information.

Example 10 includes the method of example 9, further including determining whether a result information is stored within a neural network model by querying the neural network model for the result information, and in response to determining that the result information is stored within a neural network model, extracting the information from the neural network model.

Example 11 includes the method of example 9 further including estimating a third information extraction cost corresponding to retrieval of information from third information source, the third information extraction cost added to a plurality of information costs including one or more of the first and second information extraction costs.

Example 12 includes the method of example 11 further including sorting the plurality of information extraction costs to determine an information source associated with a minimum information extraction cost of the plurality of information extraction costs.

Example 13 includes the method of example 9, wherein the first and second information extraction costs are calculated by estimating an expected amount of retrieval time for information from an information source.

Example 14 includes the method of example 9, wherein the selected information source to be queried has a minimum associated extraction cost of a sorted plurality of information costs.

Example 15 includes the method of example 9, wherein the stored information in the local knowledge base is organized using one or more of a hashing, caching, and indexing algorithm.

Example 16 includes the method of example 9, wherein explainability information corresponding to an extraction path is returned with the queried information.

Example 17 includes a non-transitory computer readable medium comprising instructions that, when executed, cause a machine to at least estimate a first information extraction cost corresponding to retrieval of information from a local knowledge base, estimate a second information extraction cost corresponding retrieval of information from a remote knowledge base, select an information source based on the first and second estimated information extraction costs, query the selected information source, in response to determining that the selected information source was an external information source, store the queried information in the local knowledge base, organize the stored information in the local knowledge base, and return the queried information.

Example 18 includes the non-transitory computer readable medium of example 17, further including determining whether a result information is stored within a neural network model by querying the neural network model for the result information, and in response to determining that the result information is stored within a neural network model, extracting the information from the neural network model.

Example 19 includes the non-transitory computer readable medium of example 17, further including estimating a third information extraction cost corresponding to retrieval of information from third information source, the third information extraction cost added to a plurality of information costs including one or more of the first and second information extraction costs.

Example 20 includes the non-transitory computer readable medium of example 19, further including sorting the plurality of information extraction costs to determine an information source associated with a minimum information extraction cost of the plurality of information extraction costs.

Example 21 includes the non-transitory computer readable medium of example 17, wherein the first and second information extraction costs are calculated by estimating an expected amount of retrieval time for information from an information source.

Example 22 includes the non-transitory computer readable medium of example 17, wherein the selected information source to be queried has a minimum associated extraction cost of a sorted plurality of information costs.

Example 23 includes the non-transitory computer readable medium of example 17, wherein the stored information in the local knowledge base is organized using one or more of a hashing, caching, and indexing algorithm.

Example 24 includes the non-transitory computer readable medium of example 17, wherein explainability information corresponding to an extraction path is returned with the queried information.

Example 25 includes an apparatus for a knowledge-based deep learning refactoring model comprising means for estimating a first information extraction cost corresponding to retrieval of information from a local knowledge base, the means for estimating to estimate a second information extraction cost corresponding to retrieval of information from a remote knowledge base, means for selecting an information source based on the first and second estimated information extraction costs, means for querying the selected information source, the means for querying to return the queried information, means for storing, in response to a determination that the selected information source was an external information source, the queried information in the local knowledge base, means for organizing the stored information in the local knowledge base.

Example 26 includes the apparatus of example 25, wherein the means for extracting is to determine whether result information is stored within a neural network model by querying the neural network model for the result information, and in response to a determination that the result information is stored within a neural network model, extract the information from the neural network model.

Example 27 includes the apparatus of example 25, wherein the means for estimating is to estimate a third information extraction cost corresponding to retrieval of information from third information source, the third information extraction cost added to a plurality of information costs including one or more of the first and second information extraction costs.

Example 28 includes the apparatus of example 27, wherein the means for selecting an information source is to further sort the plurality of information extraction costs to determine an information source associated with a minimum information extraction cost of the plurality of information extraction costs.

Example 29 includes the apparatus of example 25, wherein means for estimating is to estimate an expected amount of retrieval time for information from an information source.

Example 30 includes the apparatus of example 25, wherein the means for selecting an information source is to select the information source of a plurality of information sources to be queried based on a minimum associated extraction cost of a sorted plurality of information costs.

Example 31 includes the apparatus of example 25, wherein the stored information in the local knowledge base is to be structured using one or more of a hashing, caching, and indexing algorithm.

Example 32 includes the apparatus of example 25, wherein the means for returning the queried information is further to return explainability information corresponding to an extraction path with the queried information.

It is noted that this patent claims priority from U.S. Provisional Patent Application No. 63/125,962 which was filed on Dec. 15, 2020, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for a knowledge-based deep learning refactoring model comprising:
   interface circuitry;
   processor circuitry including one or more of:
      at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus;
      a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrated Circuitry (ASIC) including logic gate circuitry to perform one or more third operations;

the processor circuitry to perform at least one of the first operations, the second operations or the third operations to instantiate:

extraction cost estimating circuitry to estimate a first information extraction cost corresponding to retrieval of information from a local knowledge base, the extraction cost estimating circuitry to estimate a second information extraction cost corresponding retrieval of information from a remote knowledge base;

extraction path activating circuitry to select an information source based on the first and second estimated information extraction costs;

selected source information retrieval circuitry to query the selected information source, and return the queried information;

knowledge base augmenting circuitry to in response to a determination that the selected information source was an external information source, store the queried information in the local knowledge base; and knowledge base organizing circuitry to organize the stored information in the local knowledge base, and return explainability information corresponding to an extraction path with the queried information.

2. The apparatus of claim 1, wherein known information retrieval circuitry is to:

determine whether a result information is stored within a neural network model by querying the neural network model for the result information; and in response to determining that the result information is stored within a neural network model, extract the information from the neural network model.

3. The apparatus of claim 1, wherein the extraction cost estimating circuitry is to further estimate a third information extraction cost corresponding to retrieval of information from third information source, the third information extraction cost added to a plurality of information costs including one or more of a first and second information extraction cost.

4. The apparatus of claim 3, wherein extraction path activating circuitry is to further sort the plurality of information extraction costs to determine an information source associated with a minimum information extraction cost of the plurality of information extraction costs.

5. The apparatus of claim 1, wherein the extraction cost estimating circuitry is to calculate a first and second information extraction cost by estimating an expected amount of retrieval time for information from an information source.

6. The apparatus of claim 1, wherein the extraction path activating circuitry is to select the information source to be queried based on a minimum associated extraction cost of a sorted plurality of information costs.

7. The apparatus of claim 1, wherein the knowledge base organizing circuitry is to structure stored information in a local knowledge base using one or more of a hashing, caching, and indexing algorithm.

8. A method to perform information retrieval, the method comprising:

estimating a first information extraction cost corresponding to retrieval of information from a local knowledge base;

estimating a second information extraction cost corresponding retrieval of information from a remote knowledge base;

selecting an information source based on the first and second estimated information extraction costs;

querying the selected information source;

in response to determining that the selected information source was an external information source, storing the queried information in the local knowledge base;

organizing the stored information in the local knowledge base; and returning the queried information, the queried information including explainability information corresponding to an extraction path.

9. The method of claim 8, further including:

determining whether a result information is stored within a neural network model by querying the neural network model for the result information; and in response to determining that the result information is stored within a neural network model, extracting the information from the neural network model.

10. The method of claim 8 further including estimating a third information extraction cost corresponding to retrieval of information from third information source, the third information extraction cost added to a plurality of information costs including one or more of the first and second information extraction costs.

11. The method of claim 10 further including sorting the plurality of information extraction costs to determine an information source associated with a minimum information extraction cost of the plurality of information extraction costs.

12. The method of claim 8, wherein the first and second information extraction costs are calculated by estimating an expected amount of retrieval time for information from an information source.

13. The method of claim 8, wherein the selected information source to be queried has a minimum associated extraction cost of a sorted plurality of information costs.

14. The method of claim 8, wherein the stored information in the local knowledge base is organized using one or more of a hashing, caching, and indexing algorithm.

15. A non-transitory computer readable medium comprising instructions that, when executed, cause a machine to at least:

estimate a first information extraction cost corresponding to retrieval of information from a local knowledge base;

estimate a second information extraction cost corresponding retrieval of information from a remote knowledge base;

select an information source based on the first and second estimated information extraction costs;

query the selected information source;

in response to determining that the selected information source was an external information source, store the queried information in the local knowledge base;

organize the stored information in the local knowledge base; and return the queried information, wherein explainability information corresponding to an extraction path is returned with the queried information.

16. The non-transitory computer readable medium of claim 15, further including:

determining whether a result information is stored within a neural network model by querying the neural network model for the result information; and in response to determining that the result information is stored within a neural network model, extracting the information from the neural network model.

17. The non-transitory computer readable medium of claim 15, further including estimating a third information extraction cost corresponding to retrieval of information from third information source, the third information extraction cost added to a plurality of information costs including one or more of the first and second information extraction costs.

18. The non-transitory computer readable medium of claim 17, further including sorting the plurality of information extraction costs to determine an information source associated with a minimum information extraction cost of the plurality of information extraction costs.

19. The non-transitory computer readable medium of claim 15, wherein the first and second information extraction costs are calculated by estimating an expected amount of retrieval time for information from an information source.

20. The non-transitory computer readable medium of claim 15, wherein the selected information source to be queried has a minimum associated extraction cost of a sorted plurality of information costs.

21. The non-transitory computer readable medium of claim 15, wherein the stored information in the local knowledge base is organized using one or more of a hashing, caching, and indexing algorithm.

22. An apparatus for a knowledge-based deep learning refactoring model comprising:

means for estimating a first information extraction cost corresponding to retrieval of information from a local knowledge base, the means for estimating to estimate a second information extraction cost corresponding to retrieval of information from a remote knowledge base;

means for selecting an information source based on the first and second estimated information extraction costs;

means for querying the selected information source, the means for querying to return the queried information;

means for storing, in response to a determination that the selected information source was an external information source, the queried information in the local knowledge base;

means for organizing the stored information in the local knowledge base; and means for returning the queried information, the queried information including explainability information corresponding to an extraction path.

23. The apparatus of claim 22, wherein means for extracting is to:

determine whether result information is stored within a neural network model by querying the neural network model for the result information; and in response to a determination that the result information is stored within a neural network model, extract the information from the neural network model.

24. The apparatus of claim 22, wherein the means for estimating is to estimate a third information extraction cost corresponding to retrieval of information from third information source, the third information extraction cost added to a plurality of information costs including one or more of the first and second information extraction costs.

* * * * *